United States Patent
Kaneko et al.

(10) Patent No.: US 12,433,494 B2
(45) Date of Patent: Oct. 7, 2025

(54) BIOLOGICAL INFORMATION ACQUISITION DEVICE, BIOLOGICAL INFORMATION ACQUISITION SYSTEM, BIOLOGICAL INFORMATION ACQUISITION METHOD, AND BIOLOGICAL INFORMATION ACQUISITION PROGRAM

(71) Applicant: FUJIFILM CORPORATION, Tokyo (JP)

(72) Inventors: Yasuhisa Kaneko, Kanagawa (JP); Tomohide Hiragami, Kanagawa (JP); Kenji Nagamiya, Kanagawa (JP); Nobuya Kitamura, Kanagawa (JP); Yasuyuki Hosono, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 294 days.

(21) Appl. No.: 18/451,843

(22) Filed: Aug. 18, 2023

(65) Prior Publication Data
US 2023/0395219 A1 Dec. 7, 2023

Related U.S. Application Data

(63) Continuation of application No. PCT/JP2022/007995, filed on Feb. 25, 2022.

(30) Foreign Application Priority Data

Feb. 26, 2021 (JP) ................. 2021-030782

(51) Int. Cl.
*A61B 5/0205* (2006.01)
*G16H 40/67* (2018.01)

(52) U.S. Cl.
CPC .......... *A61B 5/0205* (2013.01); *G16H 40/67* (2018.01)

(58) Field of Classification Search
None
See application file for complete search history.

(56) References Cited

U.S. PATENT DOCUMENTS

2007/0213938 A1 9/2007 Kai
2015/0296020 A1* 10/2015 Granqvist ............... H04L 67/51
  455/41.2
2016/0203273 A1 7/2016 Tounooka

FOREIGN PATENT DOCUMENTS

JP 2016-031588 A 3/2016
WO 2005/104933 A1 11/2005
WO 2015/046130 A1 4/2015

OTHER PUBLICATIONS

Masaki Okuda et al., "Development of Health Promotion System using Smart-phone and Fitness Equipment", The 81st National Convention of the IPSJ (2019), Proceedings of the National Conventions (4). Interfaces, Computers and Human Society, Feb. 28, 2019, p. 4-655, right column, to p. 4-656 left column.

(Continued)

*Primary Examiner* — Michael W Kahelin
(74) *Attorney, Agent, or Firm* — SOLARIS Intellectual Property Group, PLLC

(57) ABSTRACT

A biological information acquisition device comprising: at least a first processor, wherein the first processor is configured to: establish a connection with a terminal device owned by a user via wireless communication; acquire biological information of the user; store the biological information in a database server that is external; share a storage address indicating a storage destination of the biological information in the database server with the terminal device via the wireless communication; and release the connection with the terminal device via the wireless communication after sharing the storage address with the terminal device.

20 Claims, 12 Drawing Sheets

(56) References Cited

OTHER PUBLICATIONS

Raira, "Launched at Anytime Fitness, Ebisu in Japan, GymKit compatible machines hit Japan!", May 1, 2018, p. 38, col. 4 to p. 39, col. 2.
International Search Report issued in International Application No. PCT/JP2022/007995 on May 31, 2022.
Written Opinion of the ISA issued in International Application No. PCT/JP2022/007995 on May 31, 2022.
Written Opinion of the IPEA issued in International Application No. PCT/JP2022/007995 on Mar. 14, 2023.
International Preliminary Report on Patentability issued in International Application No. PCT/JP2022/007995 on Jun. 1, 2023.

\* cited by examiner

| BIOLOGICAL INFORMATION | | DATE AND TIME INFORMATION |
|---|---|---|
| TYPE | MEASUREMENT RESULT | |
| BODY TEMPERATURE | 36.2 | 2021/1/1 12:16 |
| BLOOD PRESSURE | 80/120 | 2021/1/1 13:05 |
| URINE PROTEIN | NEGATIVE | 2021/1/1 13:23 |
| BODY TEMPERATURE | 36.8 | 2021/1/1 13:48 |
| ⋮ | ⋮ | ⋮ |

FIG. 7

DATA FILE LIST

| No. | DATE AND TIME INFORMATION | DEVICE INFORMATION | | | | STORAGE ADDRESS |
|---|---|---|---|---|---|---|
| | | TYPE | IDENTIFICATION INFORMATION | NAME | INSTALLATION LOCATION | |
| ... | ... | ... | ... | ... | ... | ... |
| 101 | 2021/1/1 12:16 | BODY TEMPERATURE | TM02 | SHINJUKU STATION TICKET GATE THERMOMETER | SHINJUKU WARD | https://abcd.com/TM02/20210101011216.txt |
| 102 | 2021/1/1 13:05 | BODY TEMPERATURE | TM01 | X DEPARTMENT STORE ENTRANCE THERMOMETER | SHINJUKU WARD | https://efgh.com/TM01/20210101011305.txt |
| 103 | 2021/1/1 13:23 | BLOOD PRESSURE | BP12 | Y DRUG STORE | SHINJUKU WARD | https://abcd.com/BP12/20210101011323.txt |
| 104 | 2021/1/1 17:00 | BODY TEMPERATURE | TM03 | TOKYO STATION TICKET GATE THERMOMETER | CHUO WARD | https://ijkl.com/TM03/20210101011700.txt |
| 105 | 2021/1/1 17:21 | URINE PROTEIN | US06 | TOKYO STATION TOILET | CHUO WARD | https://abcd.com/US06/20210101011721.txt |
| 106 | 2021/1/2 12:21 | BODY TEMPERATURE | TM02 | SHINJUKU STATION TICKET GATE THERMOMETER | SHINJUKU WARD | |

FIG. 10

| No. | BIOLOGICAL INFORMATION ACQUISITION DEVICE ||||| CONNECTABILITY |
| --- | --- | --- | --- | --- | --- |
| | TYPE | IDENTIFICATION INFORMATION | NAME | INSTALLATION LOCATION | |
| 1 | BODY TEMPERATURE | TM01 | X DEPARTMENT STORE ENTRANCE THERMOMETER | SHINJUKU WARD | POSSIBLE |
| 2 | BODY TEMPERATURE | TM02 | SHINJUKU STATION TICKET GATE THERMOMETER | SHINJUKU WARD | IMPOSSIBLE |
| 3 | BLOOD PRESSURE | – | – | – | IMPOSSIBLE |
| 4 | URINE PROTEIN | – | – | SHINJUKU WARD | POSSIBLE |
| 5 | URINE PROTEIN | – | – | CHUO WARD | IMPOSSIBLE |
| ... | ... | ... | ... | ... | ... |

DB SERVER CANDIDATE LIST

| No. | ADDRESS |
|---|---|
| 1 | https://abcd.com/ |
| 2 | https://efgh.com/ |
| 3 | https://ijkl.com/ |
| 4 | https://mnop.com/ |
| ⋮ | ⋮ |

FIG. 12

| RECEIVED DEVICE INFORMATION | | | | | |
|---|---|---|---|---|---|
| DATE AND TIME INFORMATION | DEVICE INFORMATION | | | | DESIGNATED STORAGE ADDRESS |
| | TYPE | IDENTIFICATION INFORMATION | NAME | INSTALLATION LOCATION | |
| 2021/1/2 12:21 | BODY TEMPERATURE | TM02 | SHINJUKU STATION TICKET GATE THERMOMETER | SHINJUKU WARD | https://mnop.com/TM02/202101021221.txt |

BIOLOGICAL INFORMATION ACQUISITION DEVICE, BIOLOGICAL INFORMATION ACQUISITION SYSTEM, BIOLOGICAL INFORMATION ACQUISITION METHOD, AND BIOLOGICAL INFORMATION ACQUISITION PROGRAM

CROSS REFERENCE TO RELATED APPLICATIONS

This application is a continuation of International Application No. PCT/JP2022/007995, filed on Feb. 25, 2022, which claims priority from Japanese Patent Application No. 2021-030782, filed on Feb. 26, 2021. The entire disclosure of each of the above applications is incorporated herein by reference.

BACKGROUND

Technical Field

The present invention relates to a biological information acquisition device, a biological information acquisition system, a biological information acquisition method, and a biological information acquisition program.

Related Art

In the related art, a technology is known in which biological information measured by a measurement device is stored in a database server, and the biological information can be referred to by accessing the database server using a terminal device owned by a user (for example, refer to JP2005/104933A1).

In recent years, biological information of an unspecified number of users has been acquired by biological information acquisition devices having functions of a thermometer, a sphygmomanometer, a urine examination device, and the like disposed in public places. There is a demand for a technique in which such biological information of an unspecified number of users is stored in a database server and the biological information of each user can be referred to by a terminal device owned by the user. However, JP2005/104933A1 does not describe a mode in which the number of users whose biological information is to be acquired by the information communication device is unspecified.

Furthermore, since the biological information is considered to be a type of personal information, it is desirable to reduce a risk that an administrator of the biological information acquisition device and the database server uses the biological information without permission or that the network is intercepted. That is, it is desirable to ensure confidentiality so that others cannot access the biological information.

SUMMARY

The present disclosure provides a biological information acquisition device, a biological information acquisition system, a biological information acquisition method, and a biological information acquisition program capable of securing confidentiality.

A first aspect of the present disclosure is a biological information acquisition device comprising: at least a first processor, in which the first processor establishes a connection with a terminal device owned by a user via wireless communication, acquires biological information of the user, stores the biological information in an external database server, shares a storage address indicating a storage destination of the biological information in the database server with the terminal device via the wireless communication, and releases the connection with the terminal device via the wireless communication after sharing the storage address with the terminal device.

According to a second aspect of the present disclosure, in the above aspect, the first processor may delete a connection history with the terminal device after sharing the storage address with the terminal device.

According to a third aspect of the present disclosure, in the above aspect, the first processor may receive designation of the storage address from the terminal device before storing the biological information in the database server, and may store the biological information in the database server in accordance with the storage address designated by the terminal device.

According to a fourth aspect of the present disclosure, in the above aspect, the first processor may encrypt the biological information via a predetermined method, and may store the encrypted biological information in the database server.

According to a fifth aspect of the present disclosure, in the fourth aspect, the first processor may receive a public key from the terminal device, and may store the biological information encrypted using the public key in the database server.

According to a sixth aspect of the present disclosure, in the above aspect, the first processor may establish the connection with the terminal device via the wireless communication in a case where the connection with the terminal device via the wireless communication is permitted.

According to a seventh aspect of the present disclosure, in the first to fifth aspects, the first processor may establish the connection with the terminal device via the wireless communication in a case where the terminal device is within a communicable range of the wireless communication.

According to an eighth aspect of the present disclosure, in the first to fifth aspects, the first processor may establish the connection with the terminal device via the wireless communication in a case where the connection with the terminal device via the wireless communication is permitted in advance and the terminal device is within a communicable range of the wireless communication.

According to a ninth aspect of the present disclosure, in the eighth aspect, in the terminal device, the biological information acquisition device of a connection permission target via the wireless communication may be set in advance according to at least one of identification information of the biological information acquisition device, a type of the biological information acquired by the biological information acquisition device, or an installation location of the biological information acquisition device, and the first processor may establish the connection with the terminal device via the wireless communication in a case where the biological information acquisition device is included in the connection permission target set in advance in the terminal device and the terminal device is within the communicable range of the wireless communication.

In a tenth aspect of the present disclosure, the biological information acquisition device according to the above aspect may be available for use by an unspecified number of users.

According to an eleventh aspect of the present disclosure, in the above aspect, the biological information may indicate at least one of a body temperature, a heartbeat, an electrocardiogram, a myoelectricity, a blood pressure, a weight, a body fat percentage, a muscle mass, a bone density, a blood glucose level, a urine sugar, a urine protein, or urine occult blood.

According to a twelfth aspect of the present disclosure, in the above aspect, the wireless communication may be a communication method using at least one of Bluetooth, a BLE beacon, or an RFID.

A thirteenth aspect of the present disclosure is a biological information acquisition system comprising: the biological information acquisition device according to the above aspect; and the terminal device including a second processor.

According to a fourteenth aspect of the present disclosure, in the thirteenth aspect, the second processor may create a data file in which the storage address shared with the biological information acquisition device and information regarding the biological information acquisition device are recorded in association with each other.

According to a fifteenth aspect of the present disclosure, in the fourteenth aspect, the second processor may create in a case where the connection with the biological information acquisition device via the wireless communication is established, the data file related to the biological information acquisition device, and may prohibit creation of a data file related to another biological information acquisition device before the storage address shared with the biological information acquisition device is recorded in the data file.

According to a sixteenth aspect of the present disclosure, in the fourteenth aspect or the fifteenth aspect, the second processor may refer to the storage address recorded in the data file created in the past and may designate the storage address such that the biological information is distributed and stored in a plurality of the database servers, and the first processor may store the biological information in the database servers in accordance with the storage address designated by the second processor.

According to a seventeenth aspect of the present disclosure, in the sixteenth aspect, the storage address shared with the biological information acquisition device and information indicating at least one of identification information of the biological information acquisition device, a type of the biological information acquired by the biological information acquisition device, or an installation location of the biological information acquisition device may be recorded in association with each other in the data file, and the second processor may refer to the data file created in the past and designate the storage address such that a database server different from the database servers indicated by the storage address associated with the same information as the information regarding the biological information acquisition device with which a connection via the wireless communication is currently established is set as a storage destination of the biological information.

According to an eighteenth aspect of the present disclosure, in any one of the thirteenth aspect to the seventeenth aspect, the second processor may prohibit in a case where the connection with the biological information acquisition device via the wireless communication is established, a connection with another biological information acquisition device via the wireless communication before the connection with the biological information acquisition device via the wireless communication is released.

A nineteenth aspect of the present disclosure is a biological information acquisition method in which a computer executes processing of: establishing a connection with a terminal device owned by a user via wireless communication; acquiring biological information of the user; storing the biological information in an external database server; sharing a storage address indicating a storage destination of the biological information in the database server with the terminal device via the wireless communication; and releasing the connection with the terminal device via the wireless communication after sharing the storage address with the terminal device.

A twentieth aspect of the present disclosure is a biological information acquisition program for causing a computer to execute processing of: establishing a connection with a terminal device owned by a user via wireless communication; acquiring biological information of the user; storing the biological information in an external database server; sharing a storage address indicating a storage destination of the biological information in the database server with the terminal device via the wireless communication; and releasing the connection with the terminal device via the wireless communication after sharing the storage address with the terminal device.

According to the above-described aspects, the biological information acquisition device, the biological information acquisition system, the biological information acquisition method, and the biological information acquisition program of the present disclosure can ensure confidentiality.

BRIEF DESCRIPTION OF THE DRAWINGS

FIG. 7 illustrates an example of a data file.

FIG. 10 illustrates an example of a table defining biological information acquisition devices that are connection permission targets.

FIG. 11 illustrates an example of a DB server candidate list.

FIG. 12 illustrates an example of device information of the biological information acquisition device.

DETAILED DESCRIPTION

Hereinafter, exemplary embodiments for implementing the technique of the present disclosure will be described in detail with reference to the drawings.

First Exemplary Embodiment

Figure 1:
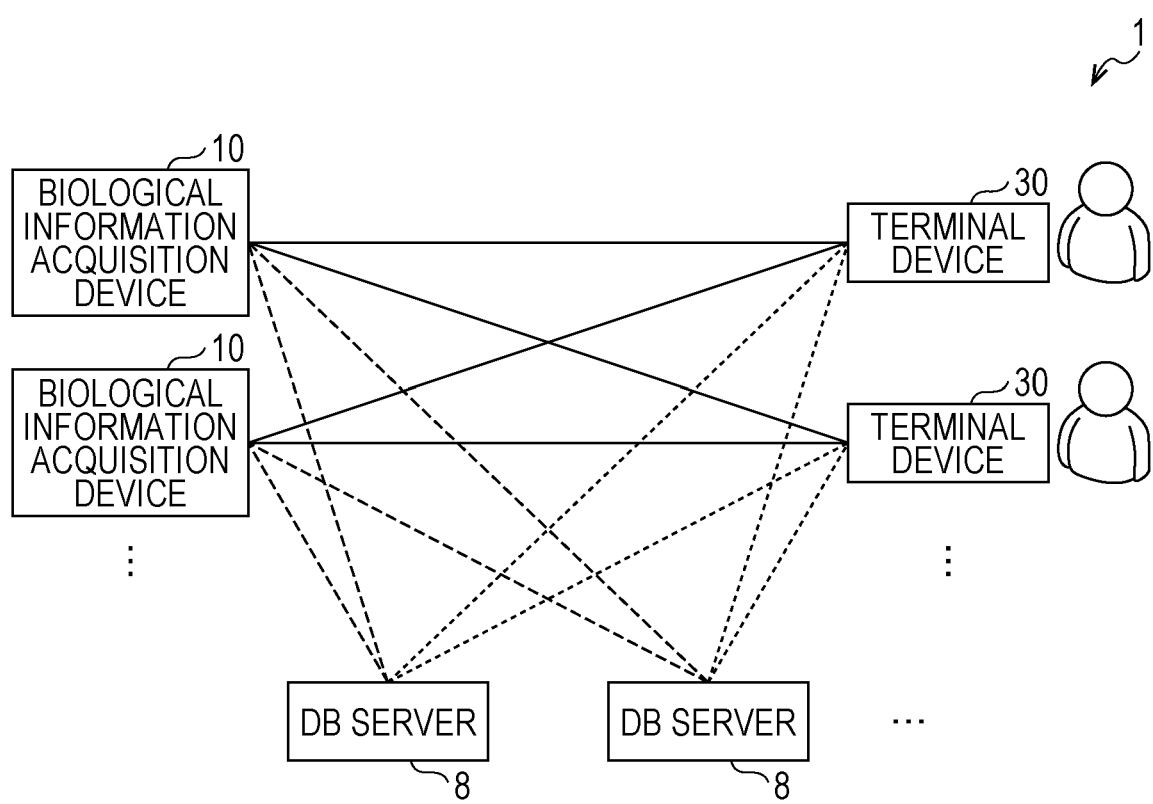
FIG. 1 is a schematic configuration diagram of a biological information acquisition system.

An example of a configuration of a biological information acquisition system 1 according to the present exemplary embodiment will be described with reference to FIG. 1. As illustrated in FIG. 1, the biological information acquisition system 1 includes at least one biological information acquisition device 10, at least one terminal device 30 each owned by a different owner, and at least one database (DB) server 8. Note that, in a case where there are a plurality of the DB servers 8, an administrator and a management company of each of the DB servers 8 may be different. Furthermore, the DB server 8 may be virtualized. The DB server 8 is an example of a database server of the present disclosure.

The biological information acquisition device 10 and the terminal device 30 (illustrated by a solid line in FIG. 1), the biological information acquisition device 10 and the DB server 8 (illustrated by a broken line in FIG. 1), and the terminal device 30 and the DB server 8 (illustrated by a dotted line in FIG. 1) are connected to each other. Specifically, the biological information acquisition device 10 and the terminal device 30 can communicate with each other via wireless communication. The biological information acquisition device 10 and the DB server 8 can communicate with each other via wired or wireless communication. The terminal device 30 and the DB server 8 can communicate with each other via wired or wireless communication.

As a communication method of the wireless communication between the biological information acquisition device 10 and the terminal device 30, at least one of known short-range wireless communication methods such as Bluetooth (registered trademark), a Bluetooth Low Energy (BLE) beacon, or a radio frequency identifier (RFID) can be applied. As a communication method of the wireless communication between the biological information acquisition device 10 and the DB server 8 and the wireless communication between the terminal device 30 and the DB server 8, a known wireless communication method such as Wi-Fi (registered trademark) can be appropriately applied.

The biological information acquisition device 10 has a function of acquiring biological information of a user. The biological information is, for example, information indicating at least one of body temperature, heartbeat, electrocardiogram, myoelectricity, blood pressure, weight, body fat percentage, muscle mass, bone density, blood glucose level, urine sugar, urine protein, or urine occult blood. Furthermore, the biological information acquisition device 10 is a device that can be used by an unspecified number of users, and is installed in a place where people gather, such as a hospital, a pharmacy, a department store, a shopping mall, a convenience store, a station, an airport, a company, a public building, an elderly person facility, and a hot spring facility.

The DB server 8 includes a database that receives the biological information acquired by the biological information acquisition device 10 and stores the received biological information. Furthermore, in response to a request from the terminal device 30, the DB server 8 transmits the biological information stored in the database to the terminal device 30.

In the biological information acquisition system 1 according to the present exemplary embodiment, the biological information of the user acquired by the biological information acquisition device 10 is stored in the DB server 8. The biological information acquisition device 10 transmits a storage address indicating a storage destination of the biological information in the DB server 8 to the terminal device 30 of the user. The terminal device 30 receives the biological information by accessing the DB server 8 indicated by the received storage address. Therefore, the user can refer to the biological information stored in the DB server 8 at any timing by using the terminal device 30 owned by the user. Hereinafter, configurations for implementing these functions will be described.

Figure 2:
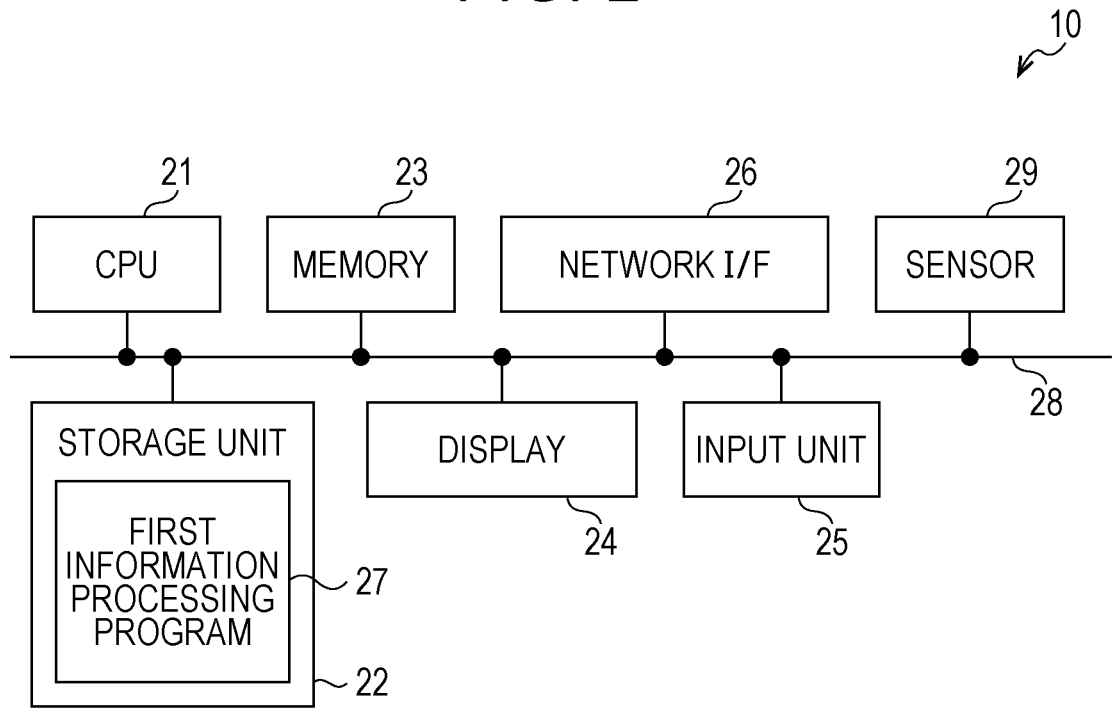
FIG. 2 is a block diagram illustrating an example of a hardware configuration of a biological information acquisition device.

An example of a hardware configuration of the biological information acquisition device 10 according to the present exemplary embodiment will be described with reference to FIG. 2. As illustrated in FIG. 2, the biological information acquisition device 10 includes a central processing unit (CPU) 21, a non-volatile storage unit 22, and a memory 23 as a temporary storage area. Furthermore, the biological information acquisition device 10 includes a display 24 such as a liquid-crystal display, an input unit 25 such as a button, a network interface (I/F) 26 that performs wireless communication with a terminal device 30 and an external network (not illustrated), and a sensor 29 that measures biological information. The CPU 21, the storage unit 22, the memory 23, the display 24, the input unit 25, the network I/F 26, and the sensor 29 are connected through a bus 28 such as a system bus or a control bus so as to exchange various information with each other.

The storage unit 22 is implemented by, for example, a storage medium such as a hard disk drive (HDD), a solid-state drive (SSD), or a flash memory. A first information processing program 27 in the biological information acquisition device 10 is stored in the storage unit 22. The CPU 21 reads out the first information processing program 27 from the storage unit 22, expands the first information processing program 27 in the memory 23, and executes the expanded first information processing program 27. The CPU 21 is an example of a first processor according to the present disclosure.

As the sensor 29, for example, a known measuring instrument capable of measuring the above-described various kinds of biological information, such as a thermometer, an electrocardiograph, a sphygmomanometer, a body composition meter, a blood glucose level measuring instrument, and a urine examination device, can be applied. Note that the sensor 29 may be incorporated into the biological information acquisition device 10, or may be an independent device that is connected to the biological information acquisition device 10 by wired or wireless communication so that biological information can be exchanged.

Figure 3:
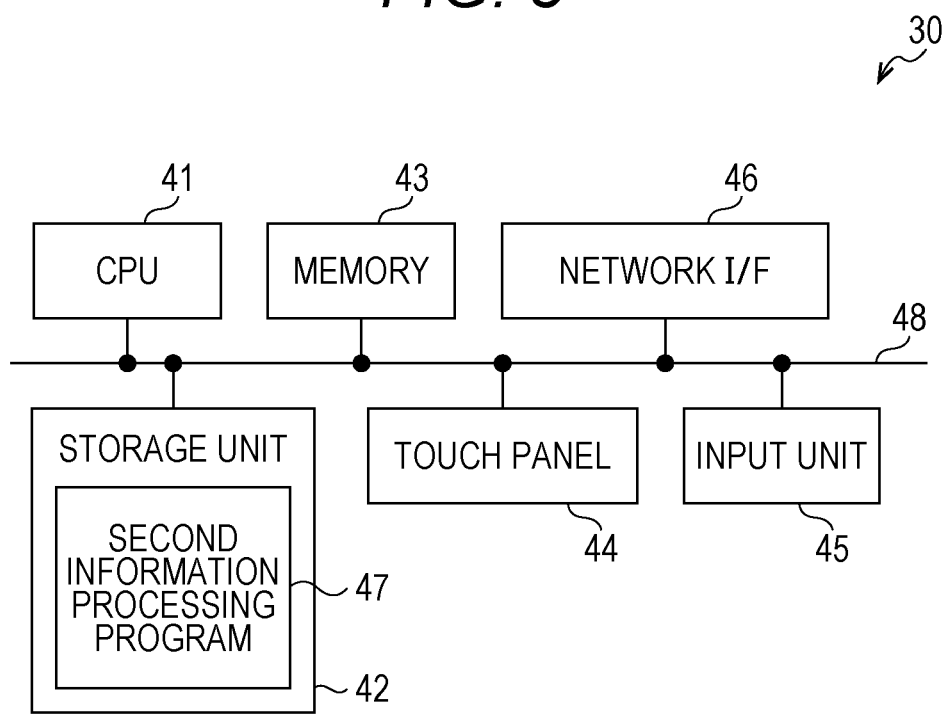
FIG. 3 is a block diagram illustrating an example of a hardware configuration of a terminal device.

The terminal device 30 is a device owned by the user, and, for example, a wearable terminal such as a smartphone, a tablet terminal, and a smartwatch can be applied. An example of a hardware configuration of the terminal device 30 according to the present exemplary embodiment will be described with reference to FIG. 3. As illustrated in FIG. 3, the terminal device 30 includes a CPU 41, a non-volatile storage unit 42, and a memory 43 as a temporary storage area. Furthermore, the terminal device 30 includes a touch panel 44, an input unit 45 such as a button, and a network I/F 46 that performs wireless communication with the biological information acquisition device 10 and an external network (not illustrated). The CPU 41, the storage unit 42, the memory 43, the touch panel 44, the input unit 45, and the network I/F 46 are connected through a bus 48 such as a system bus or a control bus so as to exchange various information with each other.

The storage unit 42 is implemented by, for example, a storage medium such as an HDD, an SSD, or a flash memory. A second information processing program 47 in the terminal device 30 is stored in the storage unit 42. The CPU 41 reads out the second information processing program 47 from the storage unit 42, expands the second information processing program 47 in the memory 43, and executes the expanded second information processing program 47. The CPU 41 is an example of a second processor of the present disclosure.

Figure 4:
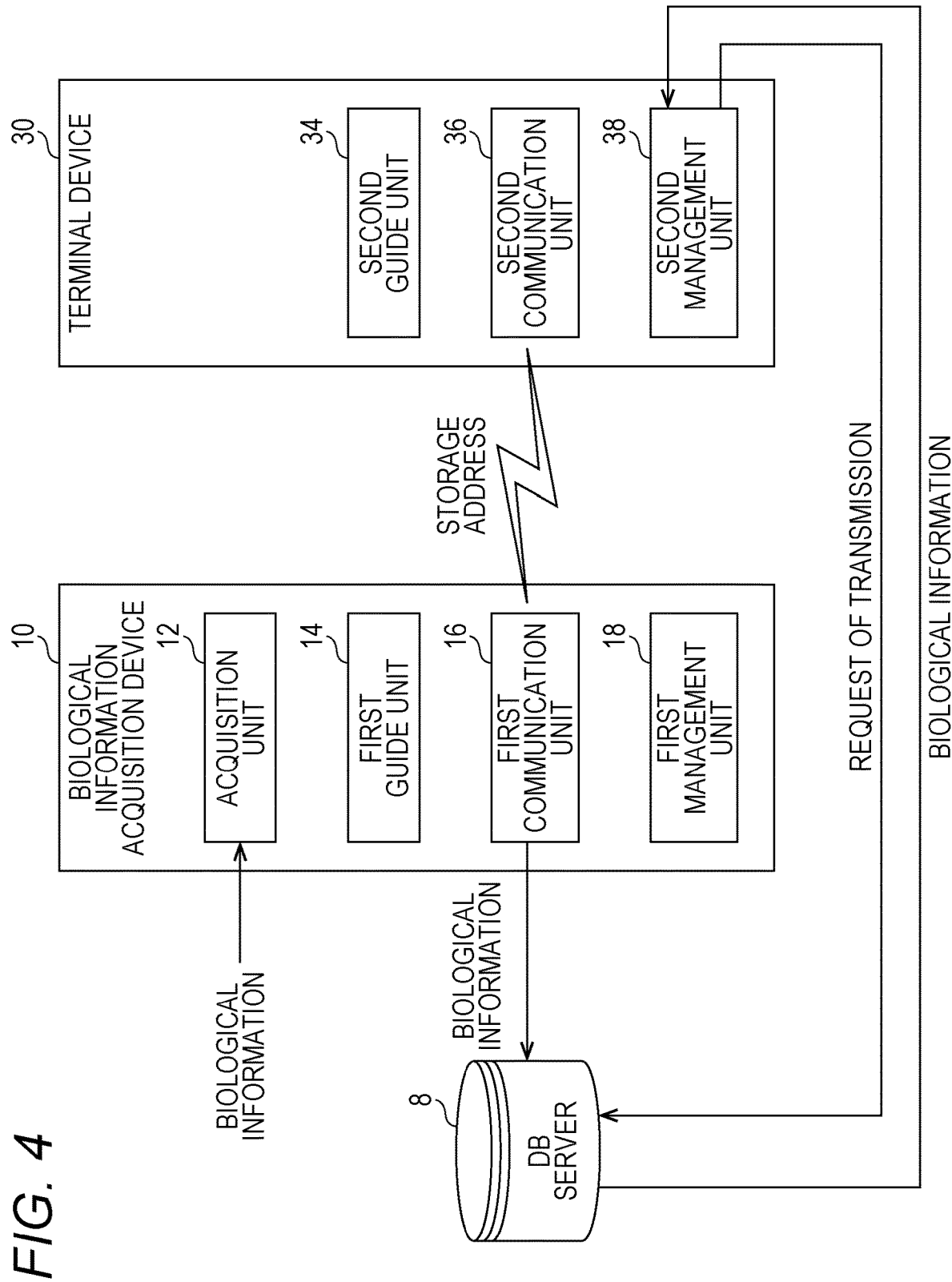
FIG. 4 is a block diagram illustrating an example of a functional configuration of the biological information acquisition device and the terminal device.

Next, an example of a functional configuration of the biological information acquisition device 10 according to the present exemplary embodiment will be described with reference to FIG. 4. As illustrated in FIG. 4, the biological information acquisition device 10 includes an acquisition unit 12, a first guide unit 14, a first communication unit 16, and a first management unit 18. The CPU 21 executes the first information processing program 27 to function as the acquisition unit 12, the first guide unit 14, the first communication unit 16, and the first management unit 18.

Figures 5, 6:
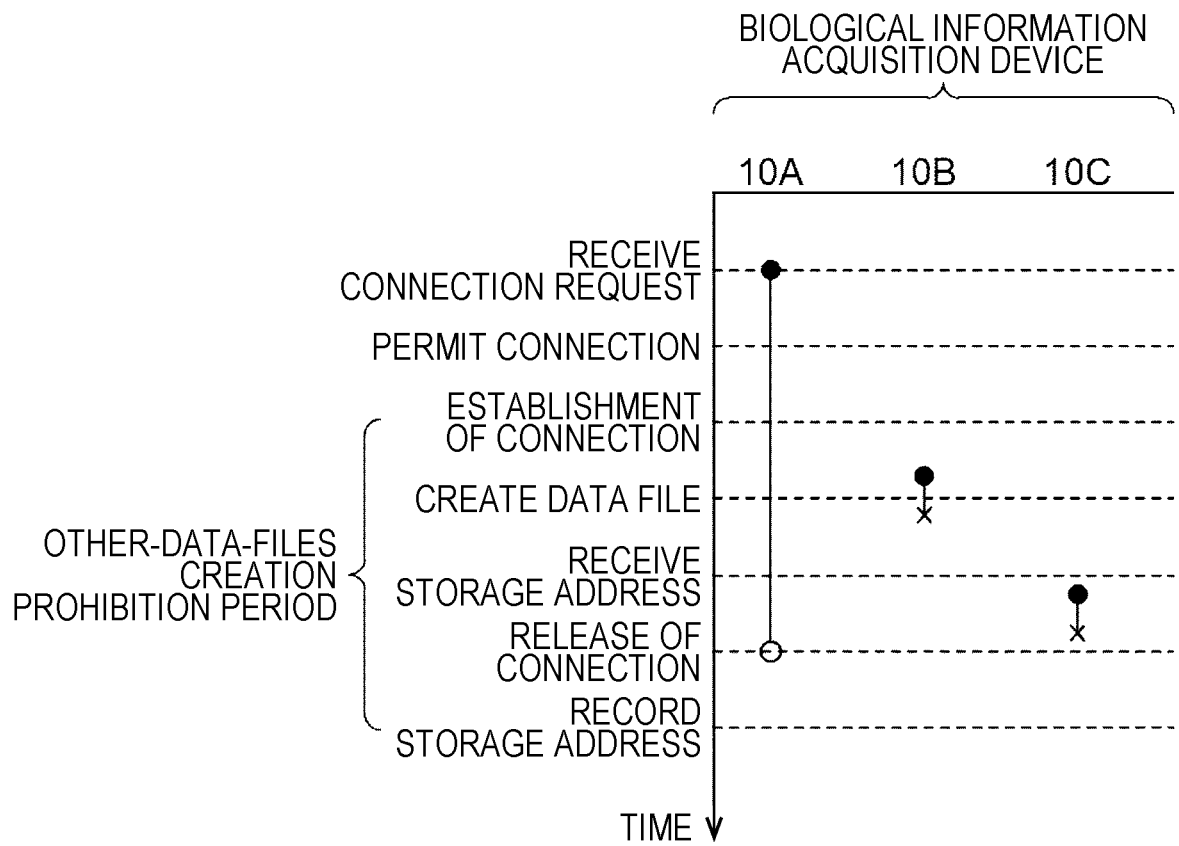
FIG. 5 illustrates an example of biological information.
FIG. 6 is a diagram for describing processing in the terminal device.

The acquisition unit 12 acquires biological information of the user measured by the sensor 29. As illustrated in FIG. 5, the biological information includes a type of the biological information and a measurement result represented by at least one of a measurement value of the biological information or a negative or positive determination result based on the measurement value. Furthermore, date and time information indicating the date and time when the biological information was acquired is added to the biological information.

The first guide unit 14 performs various kinds of guidance to the user using the display 24. For example, the first guide unit 14 displays the guidance, such as a measurement method of the biological information by the sensor 29, on the display 24.

The first communication unit 16 establishes a connection with the terminal device 30 via wireless communication. Specifically, the first communication unit 16 requests a connection via wireless communication to the terminal device 30 that is within a communicable range of wireless communication (that is, a distance that radio waves of the wireless communication can reach). In this case, the first communication unit 16 may transmit information regarding the biological information acquisition device itself (hereinafter, referred to as "device information") to the terminal device 30 via wireless communication together with a storage address. The device information is, for example, information indicating at least one of identification information of the biological information acquisition device 10, a type of biological information acquired by the biological information acquisition device 10, or an installation location of the biological information acquisition device 10 (see FIG. 7). Note that, in a case where there are a plurality of the terminal devices 30 within the communicable range of the wireless communication, the first communication unit 16 may request a connection to the terminal device 30 that is detected to be the closest according to an electric field intensity or the like.

Thereafter, the first communication unit 16 establishes a connection with the terminal device 30 via wireless communication in a case where the connection with the terminal device 30 via wireless communication is permitted. To "establish a connection" means to establish a one-to-one connection between the biological information acquisition device 10 and the terminal device 30. For example, in a case where the method of wireless communication is Bluetooth, the first communication unit 16 performs pairing with the terminal device 30.

Furthermore, the first communication unit 16 stores the biological information acquired by the acquisition unit 12 in the external DB server 8. After storing the biological information in the DB server 8, the first communication unit 16 transmits a storage address indicating a storage destination of the biological information in the DB server 8 to the terminal device 30 with which the connection is established via wireless communication. The "storage address" is represented by, for example, a uniform resource locator (URL), and may be a unique address according to the device information and the date and time information of the biological information acquisition device 10 (refer to FIG. 7). After transmitting the storage address to the terminal device 30, the first communication unit 16 releases the connection with the terminal device 30 via wireless communication.

After the first communication unit 16 transmits the storage address to the terminal device 30, the first management unit 18 deletes a connection history with the terminal device 30. "Deletion of the connection history" means deleting the information necessary for the connection acquired when the connection with the terminal device 30 via the wireless communication is established. That is, the biological information acquisition device 10 and the terminal device 30 are temporarily connected to each other when the storage address is transmitted and received. For example, in a case where the method of wireless communication is Bluetooth, the first management unit 18 releases the pairing. Note that, after the first management unit 18 deletes the connection history, in order for the first communication unit 16 to establish the connection with the terminal device 30 via wireless communication again, it is necessary to acquire information necessary for the connection again. For example, in a case where the method of wireless communication is Bluetooth, pairing needs to be performed again.

There may be a case where the biological information acquisition device 10 that has acquired biological information of another user is disposed within a communicable range of wireless communication of the terminal device 30. Therefore, the terminal device 30 has a function of not performing establishment of a connection with the biological information acquisition device 10 that has acquired biological information of another user, reception of a storage address, and the like. Next, with reference to FIGS. 4 and 6, an example of a functional configuration of the terminal device 30 according to the present exemplary embodiment will be described.

As illustrated in FIG. 4, the terminal device 30 includes a second guide unit 34, a second communication unit 36, and a second management unit 38. By executing the second information processing program 47, the CPU 41 functions as the second guide unit 34, the second communication unit 36, and the second management unit 38.

With reference to FIG. 6, processing in the second guide unit 34, the second communication unit 36, and the second management unit 38 will be described in time series. FIG. 6 illustrates processing of the terminal device 30 in time series in a case where the terminal device 30 and a biological information acquisition device 10A establish a connection via wireless communication. Furthermore, in FIG. 6, a black circle indicates a time point at which the biological information acquisition device 10A requests a connection via wireless communication to the terminal device 30, and a white circle indicates a time point at which the biological information acquisition device 10A releases the connection with the terminal device 30.

Furthermore, it is assumed that biological information acquisition devices 10B and 10C are devices which are disposed within a communicable range of wireless communication of the terminal device 30, which have acquired biological information of another user. Time points at which the biological information acquisition devices 10B and 10C can request the terminal device 30 to connect via wireless communication are indicated by black circles.

As illustrated in FIG. 6, first, the second communication unit 36 receives a request for connection via wireless communication and device information from the biological information acquisition device 10A. The second guide unit 34 performs various kinds of guidance to the user using the touch panel 44. For example, in a case where there is a connection request via wireless communication from the biological information acquisition device 10A, the second guide unit 34 causes the touch panel 44 to display guidance such as "Do you want to connect to the biological information acquisition device?" to allow the user to select whether or not to permit a connection with the biological information acquisition device 10A. That is, the user operates the touch panel 44 to input the selection of whether or not to permit the connection with the biological information acquisition device 10A. In a case where the connection is permitted by the user, the second communication unit 36 establishes the connection with the biological information acquisition device 10A via wireless communication.

In a case where the second communication unit 36 establishes connection with the biological information acquisition device 10A via wireless communication, the second management unit 38 creates a data file related to the biological information acquisition device 10A. FIG. 7 illustrates an example of the data file. As illustrated in FIG. 7, the "data file" is a file for recording the storage address and the device information related to the biological information acquisition device 10A received from the biological information acquisition device 10A in association with each other. The data files of Nos. 101 to 105 illustrated in FIG. 7 are data files in which the storage addresses have already been recorded. The data file of No. 106 is a file related to the biological information acquisition device 10A with which the connection via the wireless communication is currently established, and the storage address is not yet recorded at this time. As illustrated in FIG. 7, the data file is created for each biological information acquisition device 10 with which the connection is established, and is accumulated in, for example, the storage unit 42 of the terminal device 30.

After the data file is created by the second management unit 38, the second communication unit 36 receives the storage address from the biological information acquisition device 10 through wireless communication. After the storage address is received, the second communication unit 36 releases the connection with the biological information acquisition device 10 via wireless communication. The second management unit 38 records the storage address received by the second communication unit 36 in the data file.

Furthermore, the second management unit 38 prohibits the creation of data files (hereinafter, referred to as "other data files") related to the other biological information acquisition devices 10B and 10C before the storage address received from the biological information acquisition device 10A is recorded in the created data file related to the biological information acquisition device 10A. Specifically, the second management unit 38 prohibits the creation of any other data files during a period from when the second communication unit 36 establishes the connection with the biological information acquisition device 10A to when the storage address is recorded in the data file (hereinafter, referred to as "other-data-files creation prohibition period").

For example, as illustrated in FIG. 6, even if a connection request is received from the biological information acquisition devices 10B and 10C during the other-data-files creation prohibition period, the second management unit 38 does not create data files related to the biological information acquisition devices 10B and 10C. Accordingly, even in a case where the biological information acquisition devices 10B and 10C that acquire the biological information of the other users are disposed within the communicable range of the wireless communication of the terminal device 30, the terminal device 30 does not receive the storage address related to the biological information of the other users. Note that, even when not in the other-data-files creation prohibition period, for example, in a case where the user rejects the connection with the biological information acquisition device 10, the connection is not established, and no other data files are created.

In a case where there is a request for viewing from the user, the second management unit 38 may refer to the recorded data file, request the DB server 8 indicated by the storage address to transmit the biological information, and receive the biological information from the DB server 8. The request for viewing by the user may be made via the touch panel 44, for example. In this case, the second guide unit 34 may present the device information recorded in the data file so that the user can selectively request which biological information to view based on the device information.

Figure 8:
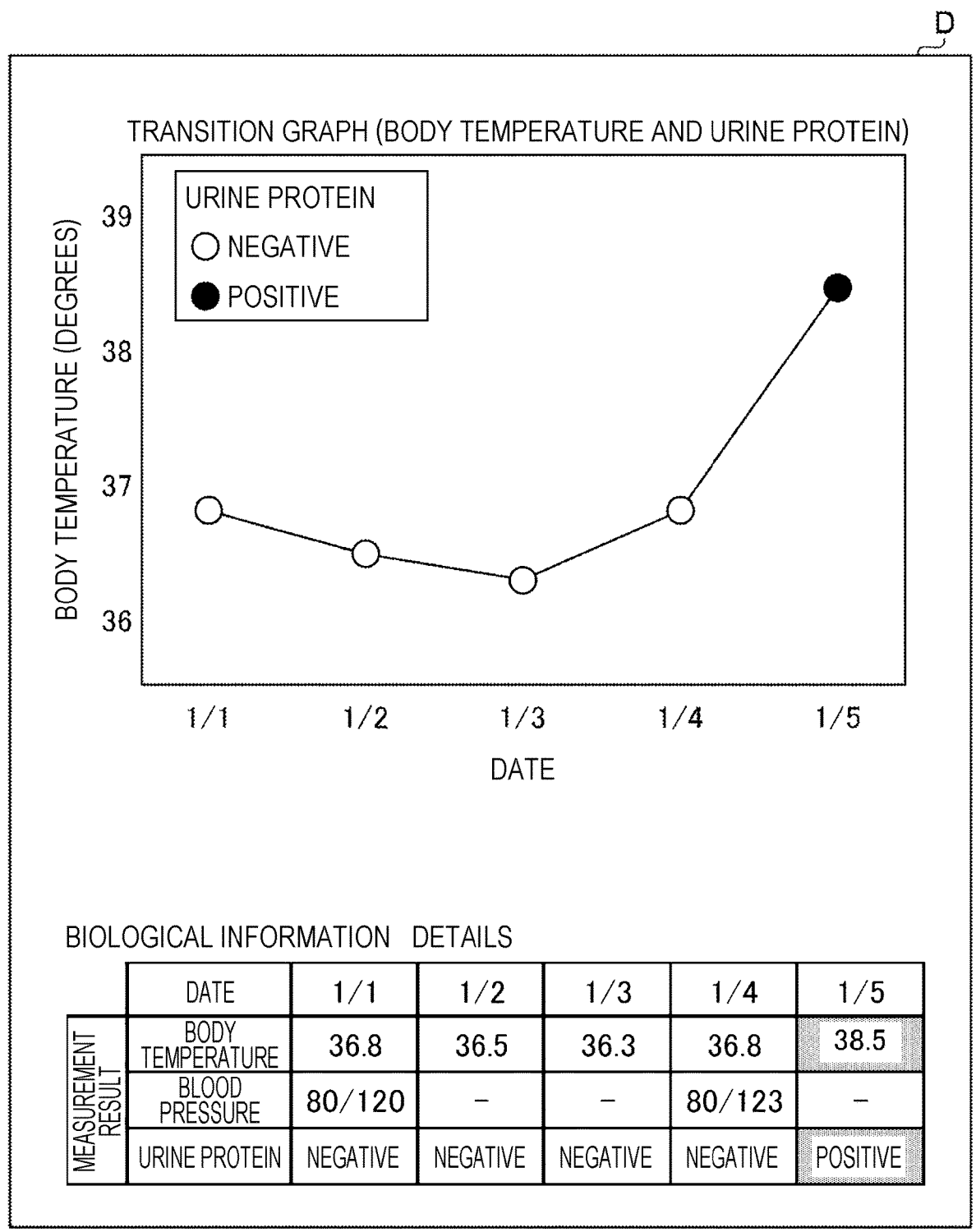
FIG. 8 illustrates an example of a screen displayed on the terminal device.

Furthermore, the second guide unit 34 may display the biological information received from the DB server 8 on the touch panel 44. FIG. 8 illustrates an example of a screen D displayed on the touch panel 44 by the second guide unit 34. In the example of FIG. 8, the maximum body temperature for each date is illustrated by a line graph, and a determination result of urine protein for each date is illustrated by changing the color of the plot. As described above, the second guide unit 34 may process and display the biological information in an easy-to-see format using a graph, color coding, or the like.

Figure 9:
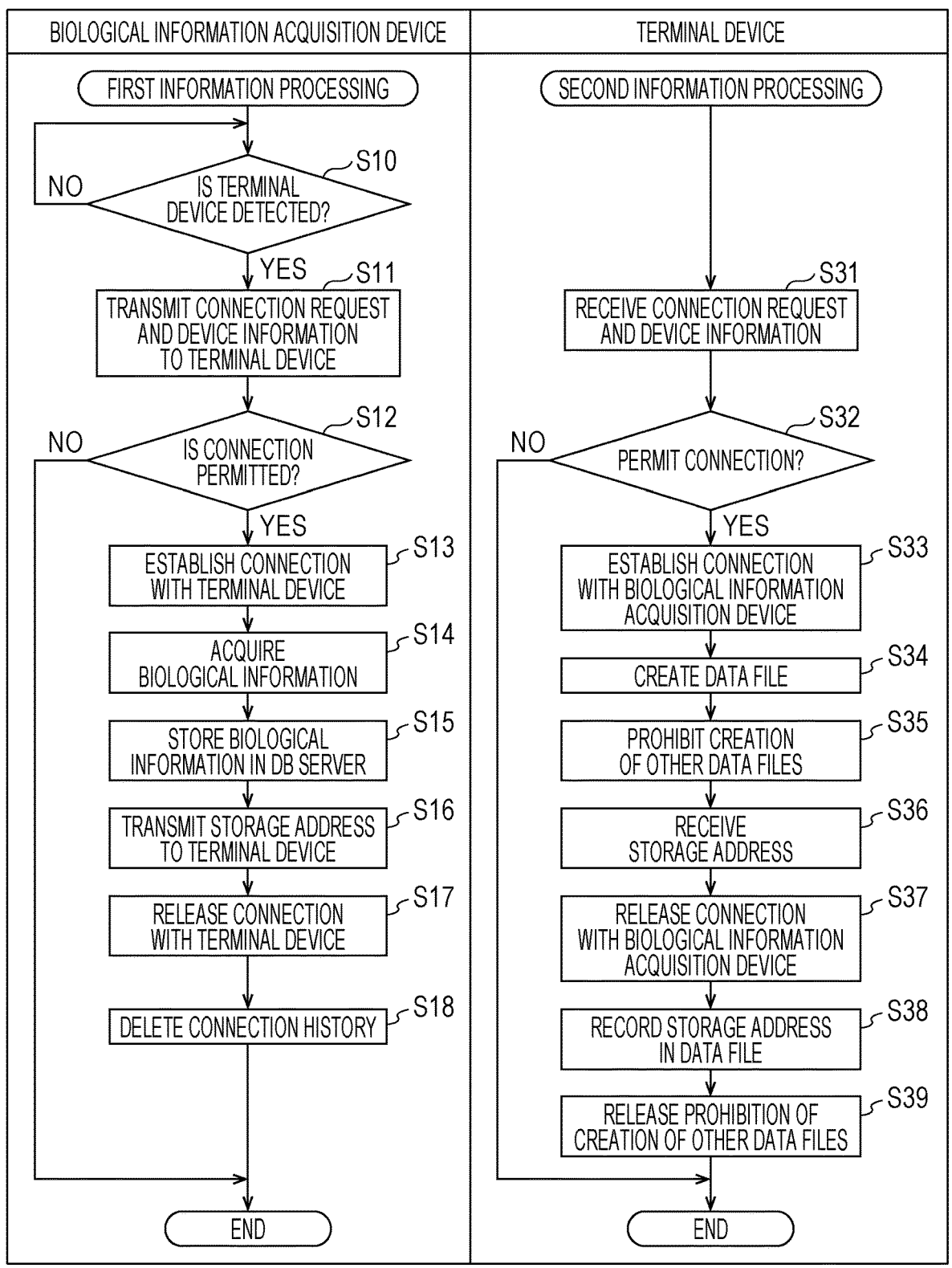
FIG. 9 is a flowchart illustrating an example of information processing according to a first exemplary embodiment.

Next, an action of the biological information acquisition device 10 and the terminal device 30 according to the present exemplary embodiment will be described with reference to FIG. 9. FIG. 9 illustrates a flowchart illustrating first information processing executed in the biological information acquisition device 10 and a flowchart illustrating second information processing executed in the terminal device 30 side by side. As described above, since there is processing performed between the biological information acquisition device 10 and the terminal device 30, for ease of understanding, corresponding steps between the devices are described side by side.

First, the first information processing executed in the biological information acquisition device 10 will be described. In the biological information acquisition device 10, the CPU 21 executes the first information processing program 27 to execute the first information processing illustrated in FIG. 9. The first information processing is started, for example, in a case where there is an instruction to start the processing from the user through the input unit 25.

In step S10, the first communication unit 16 stands by until the terminal device 30 is detected in the communicable range of the wireless communication. In a case where an affirmative determination is made in step S10 (that is, in a case where the terminal device 30 is detected), the process proceeds to step S11, and the first communication unit 16 requests the terminal device 30 to connect via wireless communication and transmits the device information. After that, in step S12, the process stands by until the connection via wireless communication is permitted or prohibited.

In a case where an affirmative determination is made in step S12 (that is, in a case where the connection with the terminal device 30 is permitted), the process proceeds to step S13, and the first communication unit 16 establishes the connection with the terminal device 30 via wireless communication. In step S14, the acquisition unit 12 acquires the biological information of the user measured by the sensor 29. In step S15, the first communication unit 16 stores the biological information acquired in step S14 in the external DB server 8.

In step S16, for the biological information stored in the DB server 8 in step S15, the first communication unit 16 transmits a storage address indicating a storage destination of the biological information in the DB server 8 to the terminal device 30 via wireless communication. In step S17, the first communication unit 16 releases the connection with the terminal device 30 via wireless communication. In step S18, the first management unit 18 deletes the connection history with the terminal device 30 with which the connection has been established in steps S13 to S17, and ends the first information processing.

On the other hand, in a case where a negative determination is made in step S12 (that is, in a case where the connection with the terminal device 30 is prohibited), the first information processing ends.

Next, the second information processing executed in the terminal device 30 will be described. In the terminal device 30, the CPU 41 executes the second information processing program 47 to execute the second information processing illustrated in FIG. 9. The second information processing is started in a case where a request for connection is received from the biological information acquisition device 10 (step S31).

In step S31, the second communication unit 36 receives the request for connection via wireless communication and the device information from the biological information acquisition device 10. In step S32, the second guide unit 34 displays, on the touch panel 44, guidance for prompting the user to select whether or not to permit the connection with the biological information acquisition device 10, and stands by until the connection is permitted or prohibited.

In a case where an affirmative determination is made in step S32 (that is, in a case where the connection with the biological information acquisition device 10 is permitted), the process proceeds to step S33, and the second communication unit 36 establishes the connection with the biological information acquisition device 10 via wireless communication. In step S34, the second management unit 38 creates a data file related to the biological information acquisition device 10 with which the connection has been established in step S33. In step S35, the second management unit 38 prohibits the creation of other data files related to the biological information acquisition devices 10 other than the biological information acquisition device 10 with which the connection has been established in step S33.

In step S36, the second communication unit 36 receives the storage address through wireless communication from the biological information acquisition device 10 with which the connection has been established in step S33. In step S37, the second communication unit 36 releases the connection with the biological information acquisition device 10 via wireless communication. In step S38, the second management unit 38 records the storage address received in step S36 in the data file created in step S34. In step S39, the second management unit 38 releases the prohibition of the creation of the other data files prohibited in step S35, and the second information processing ends.

On the other hand, in a case where a negative determination is made in step S32 (that is, in a case where the connection with the biological information acquisition device 10 is prohibited), the second information processing ends without performing the establishment of the connection with the biological information acquisition device 10, the creation of the data file, the reception of the storage address, and the like.

As described above, the biological information acquisition device 10 includes at least one processor, and the processor establishes a connection with the terminal device 30 owned by the user via wireless communication, acquires biological information of the user, stores the biological information in the external DB server 8, shares a storage address indicating a storage destination of the biological information in the DB server 8 with the terminal device 30 via wireless communication, and releases the connection with the terminal device 30 via wireless communication after sharing the storage address with the terminal device 30. That is, the biological information acquisition device 10 performs a temporal connection with the terminal device 30 owned by the user who is an acquisition source of the biological information to share only the storage address, and does not perform transmission and reception of the biological information. Therefore, it is possible to ensure confidentiality.

Note that, in the first exemplary embodiment, a mode has been described in which the biological information acquisition device 10 confirms with the user whether or not the connection with the terminal device 30 via the wireless communication is possible and establishes the connection with the terminal device 30 via the wireless communication in a case where the connection is permitted, but the present disclosure is not limited thereto. For example, the first communication unit 16 may establish the connection with the terminal device 30 via wireless communication in a case where the terminal device 30 is within a communicable range of the wireless communication. That is, the first communication unit 16 may automatically connect with the terminal device 30 in the communicable range of the wireless communication without confirming with the user whether or not the connection is possible.

Furthermore, for example, the first communication unit 16 may establish the connection with the terminal device 30 via wireless communication in a case where the connection with the terminal device 30 via wireless communication is permitted in advance and the terminal device 30 is within a communicable range of the wireless communication. Specifically, in the terminal device 30, the biological information acquisition device 10 of a connection permission target via the wireless communication is set in advance according to the device information, and in a case where the biological information acquisition device 10 is the connection permission target, the connection with the terminal device 30 may be automatically established.

In this case, the second communication unit 36 determines whether or not the biological information acquisition device 10 is included in connection permission targets on the basis of the device information received from the biological information acquisition device 10. The determination may be performed, for example, by collating the received device information with a table in which the biological information acquisition devices 10 as the connection permission targets are predetermined based on the device information. FIG. 10 illustrates an example of a table T in which the biological information acquisition devices 10 as the connection permission targets through wireless communication are preset according to the device information. In FIG. 10, a case where "connectability" is "possible" is a connection permission target, and a case where "connectability" is "impossible" is not a connection permission target. For example, the table T may be set in advance by the user and stored in the storage unit 42.

For example, as illustrated in Nos. 1 and 2 of FIG. 10, the connectability may be individually set according to the identification information of the biological information acquisition devices 10. Furthermore, for example, as illustrated in No. 3 of FIG. 10, the connectability may be individually set according to the type of the biological information acquired by the biological information acquisition device 10. Furthermore, for example, as illustrated in Nos. 4 and 5 of FIG. 10, the connectability may be individually set according to the installation locations of the biological information acquisition devices 10. Furthermore, for example, the connectability may be individually set according to the name of the biological information acquisition device 10, such as making the biological information acquisition device 10 whose name includes "entrance" a connection permission target. Furthermore, these examples may be appropriately combined. Note that, in FIG. 10, a ward is illustrated as an example of the "installation location", but the present disclosure is not limited thereto, and, for example, the connectability may be individually set according to a prefecture, a municipality, a facility, a structure in the facility such as an entrance and an exit, and a toilet.

In a case where the determination of whether or not the biological information acquisition device 10 is included in the connection permission targets is completed, the second communication unit 36 transmits the determination result to the biological information acquisition device 10. In the biological information acquisition device 10, in a case where the first communication unit 16 receives the determination result that the biological information acquisition device itself is the connection permission target, the first communication unit 16 establishes the connection with the terminal device 30 via the wireless communication. That is, the biological information acquisition device 10 may establish the connection with the terminal device 30 via the wireless communication in a case where the biological information acquisition device itself is included in the connection permission targets set in advance in the terminal device 30 and the terminal device 30 is in the communicable range of the wireless communication.

Furthermore, in the first exemplary embodiment, a mode has been described in which the terminal device 30 sets a period from the establishment of the connection with the biological information acquisition device 10 to the recording of the storage address in the data file as the other-data-files creation prohibition period, but the present disclosure is not limited thereto. It is only necessary for the terminal device 30 to avoid receiving the storage address related to the biological information of another user. For example, a period from when the connection with the biological information acquisition device 10 is established to when the connection with the biological information acquisition device 10 via wireless communication is released may be applied as the other-data-files creation prohibition period.

Furthermore, for example, while the terminal device 30 establishes a connection with a certain biological information acquisition device 10, the terminal device 30 prohibits a connection with another biological information acquisition device 10 to avoid reception of a storage address related to biological information of another user. That is, in a case where the connection with the biological information acquisition device 10 via wireless communication is established, before the connection with the biological information acquisition device 10 via wireless communication is released, the second management unit 38 of the terminal device 30 may prohibit the connection with other biological information acquisition devices 10 via wireless communication.

Furthermore, in the first exemplary embodiment, the first communication unit 16 may encrypt the biological information acquired by the acquisition unit 12 via a predetermined method, and store the encrypted biological information in the DB server 8. As a method of encryption, a known method such as a public key encryption method, a common key encryption method, or a blockchain can be appropriately applied. By encrypting the biological information, it is possible to further improve the confidentiality.

For example, in a case where a public key encryption method is applied, the terminal device 30 has a set of a public key and a secret key. In a case where the connection with the biological information acquisition device 10 is established, the second communication unit 36 of the terminal device 30 transmits the public key to the biological information acquisition device 10. The first communication unit 16 of the biological information acquisition device 10 receives the public key from the terminal device 30, and stores the biological information encrypted using the received public key in the DB server 8. In a case where the terminal device 30 refers to the biological information stored in the DB server 8, the second guide unit 34 receives the encrypted biological information from the DB server 8 and decrypts the encrypted biological information using the secret key.

Furthermore, in the first exemplary embodiment, a mode has been described in which the terminal device 30 records the storage address in the data file after the connection with the biological information acquisition device 10 is released, but the order of these processes may be switched. That is, the terminal device 30 may record the storage address in the data file while establishing the connection with the biological information acquisition device 10, and may release the connection with the biological information acquisition device 10 after the recording.

Furthermore, in the first exemplary embodiment, the biological information acquisition device 10 may include known payment means using, for example, cash, a credit card, an integrated circuit (IC) card, a QR code (registered trademark), or the like, and may have a function of allowing the user to settle a usage fee. For example, the biological information acquisition device 10 may settle the usage fee before the sensor 29 measures the biological information.

Second Exemplary Embodiment

In the first exemplary embodiment, a mode has been described in which the biological information acquisition device 10 stores the biological information in the DB server 8 and transmits the storage address indicating the storage destination to the terminal device 30, but in the present exemplary embodiment, a mode will be described in which the terminal device 30 designates the storage address. By designating the storage address by the terminal device 30, for example, in a case where there are a plurality of the DB servers 8 that can be accessed by the terminal device 30, it is possible to distribute and store the biological information related to the same user, and thus, it is possible to further improve confidentiality. Hereinafter, an example of functions of the biological information acquisition device 10 and the terminal device 30 according to the present exemplary embodiment will be described, but overlapping description of the same configuration and action as in the first exemplary embodiment will be omitted.

As illustrated in FIG. 11, the terminal device 30 includes a candidate list of the plurality of DB servers 8 accessible by the terminal device 30. The candidate list of the DB servers 8 is stored in, for example, the storage unit 42. The second management unit 38 refers to the storage address recorded in the data file (see FIG. 7) created in the past, and designates the storage address such that the biological information is distributed and stored in the plurality of DB servers 8.

Specifically, the second communication unit 36 receives a request for connection via wireless communication and device information from the biological information acquisition device 10, and establishes the connection with the biological information acquisition device 10 via wireless communication. Thereafter, the second management unit 38 refers to the data file created in the past, and designates a storage address such that the DB server 8 different from the DB server 8 indicated by the storage address associated with the same device information as the device information related to the biological information acquisition device 10 with which the connection via wireless communication is currently established is set as a storage destination of the biological information.

In order to further improve the confidentiality, it is preferable to store biological information having the same device information in different DB servers 8. For example, it is assumed that the second communication unit 36 receives device information illustrated in FIG. 12 (corresponding to No. 106 illustrated in FIG. 7). The second management unit 38 collates a list of the data files illustrated in FIG. 7 with the device information illustrated in FIG. 12. Since the device information illustrated in FIG. 12 is the same as all of the device information of type, identification information, name, and installation location of No. 101 in FIG. 7, the DB server 8 of No. 1 in FIG. 11 (https://abcd.com/) is excluded from the designation candidates. Similarly, since No. 102 has the same type and installation location, No. 103 has the same installation location, and No. 104 has the same type, the DB servers 8 of No. 2 and No. 3 in FIG. 11 are also excluded from the designation candidates. The second management unit 38 designates the storage address so that the remaining DB server 8 of No. 4 in the candidate list of the DB servers 8 in FIG. 11 is set as a storage destination of the biological information.

Note that, for example, as illustrated in No. 101 and No. 105 of FIG. 7, the second management unit 38 may designate a storage address such that the same DB server 8 is set as a storage destination for pieces of biological information having different device information.

Furthermore, the second management unit 38 may designate a storage address such that pieces of biological information in which at least one piece of device information is the same are stored in different DB servers 8. For example, as illustrated in No. 101 and No. 103 of FIG. 7, storage addresses may be designated such that pieces of biological information in which part of device information overlaps each other are stored in the same DB server 8. In this case, it is preferable that the second management unit 38 designates a storage address so as to store the pieces of biological information having a low degree of matching of the device information (that is, having a small number of matching pieces of device information such as the type, the identification information, and the installation location) in the same DB server 8.

In the biological information acquisition device 10, the first communication unit 16 receives the designation of the storage address from the terminal device 30 before storing the biological information in the DB server 8. Furthermore, the first communication unit 16 stores the biological information acquired by the acquisition unit 12 in the DB server 8 in accordance with the storage address designated by the terminal device 30.

Figure 13:
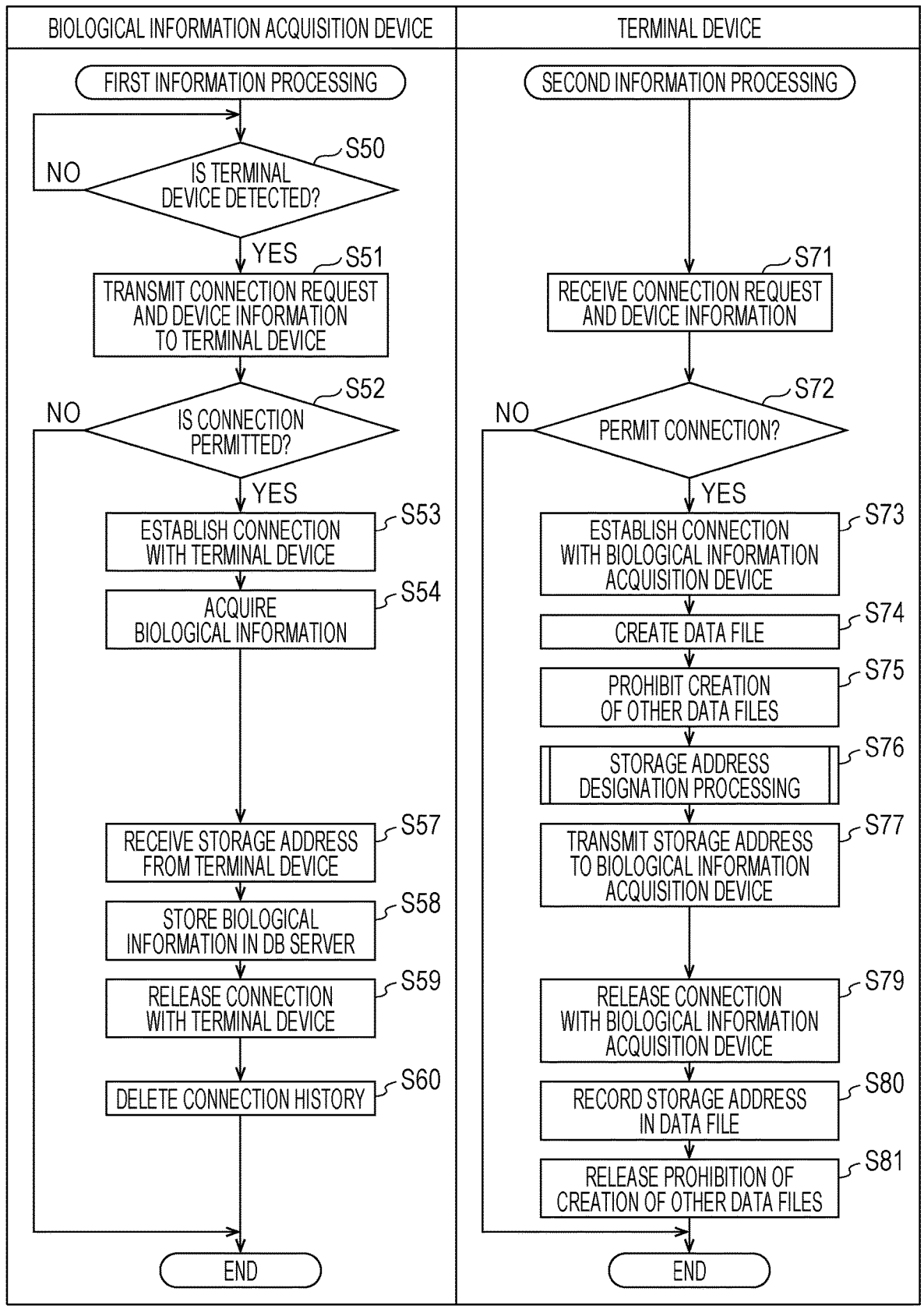
FIG. 13 is a flowchart illustrating an example of information processing according to a second exemplary embodiment.

Next, actions of the biological information acquisition device 10 and the terminal device 30 according to the present exemplary embodiment will be described with reference to FIG. 13. FIG. 13 illustrates a flowchart illustrating the first information processing executed in the biological information acquisition device 10 and a flowchart illustrating the second information processing executed in the terminal device 30 side by side. As described above, since there is processing performed between the biological information acquisition device 10 and the terminal device 30, for ease of understanding, corresponding steps between the devices are described side by side.

First, the first information processing executed in the biological information acquisition device 10 will be described. In the biological information acquisition device 10, the CPU 21 executes the first information processing program 27 to execute the first information processing illustrated in FIG. 13. The first information processing is started, for example, in a case where there is an instruction to start the processing from the user through the input unit 25.

In step S50, the first communication unit 16 stands by until the terminal device 30 is detected in the communicable range of the wireless communication. In a case where an affirmative determination is made in step S50 (that is, in a case where the terminal device 30 is detected), the process proceeds to step S51, and the first communication unit 16 requests the terminal device 30 to connect via wireless communication and transmits the device information. After that, in step S52, the process stands by until the connection via wireless communication is permitted or prohibited.

In a case where an affirmative determination is made in step S52 (that is, in a case where the connection with the terminal device 30 is permitted), the process proceeds to step S53, and the first communication unit 16 establishes a connection with the terminal device 30 through wireless communication. In step S54, the acquisition unit 12 acquires the biological information of the user measured by the sensor 29.

In step S57, the first communication unit 16 receives a storage address indicating a storage destination of the biological information from the terminal device 30. In step S58, the first communication unit 16 stores the biological information acquired in step S54 in the DB server 8 indicated by the storage address received from the terminal device 30 in step S57. In step S59, the first communication unit 16 releases the connection with the terminal device 30 via wireless communication. In step S60, the first management unit 18 deletes the connection history with the terminal device 30 with which the connection has been established in steps S53 to S59, and ends the first information processing.

On the other hand, in a case where a negative determination is made in step S52 (that is, in a case where the connection with the terminal device 30 is prohibited), the first information processing ends.

Next, the second information processing executed in the terminal device 30 will be described. In the terminal device 30, the CPU 41 executes the second information processing program 47 to execute the second information processing illustrated in FIG. 13. The second information processing is started in a case where a request for connection is received from the biological information acquisition device 10 (step S71).

In step S71, the second communication unit 36 receives the request for connection via wireless communication and the device information from the biological information acquisition device 10. In step S72, the second guide unit 34 displays, on the touch panel 44, guidance for prompting the user to select whether or not to permit the connection with the biological information acquisition device 10, and stands by until the connection is permitted or prohibited.

In a case where an affirmative determination is made in step S72 (that is, in a case where the connection with the biological information acquisition device 10 is permitted), the process proceeds to step S73, and the second communication unit 36 establishes the connection with the biological information acquisition device 10 via wireless communication. In step S74, the second management unit 38 creates a data file related to the biological information acquisition device 10 with which the connection has been established in step S73. In step S75, the second management unit 38 prohibits the creation of other data files related to the biological information acquisition devices 10 other than the biological information acquisition device 10 with which the connection has been established in step S73.

In step S76, the second management unit 38 executes storage address designation processing (details will be described later) and designates a storage address indicating a storage destination of biological information. In step S77, the second communication unit 36 transmits the storage address designated in step S76 to the biological information acquisition device 10 through wireless communication. In step S79, the second communication unit 36 releases the connection with the biological information acquisition device 10 via wireless communication. In step S80, the second management unit 38 records the storage address designated in step S76 in the data file created in step S74. In step S81, the second management unit 38 releases the prohibition of the creation of the other data files prohibited in step S75, and the second information processing ends.

On the other hand, in a case where a negative determination is made in step S72 (that is, in a case where the connection with the biological information acquisition device 10 is prohibited), the second information processing ends without performing the establishment of the connection with the biological information acquisition device 10, the creation of the data file, the designation of the storage address, and the like.

Figure 14:
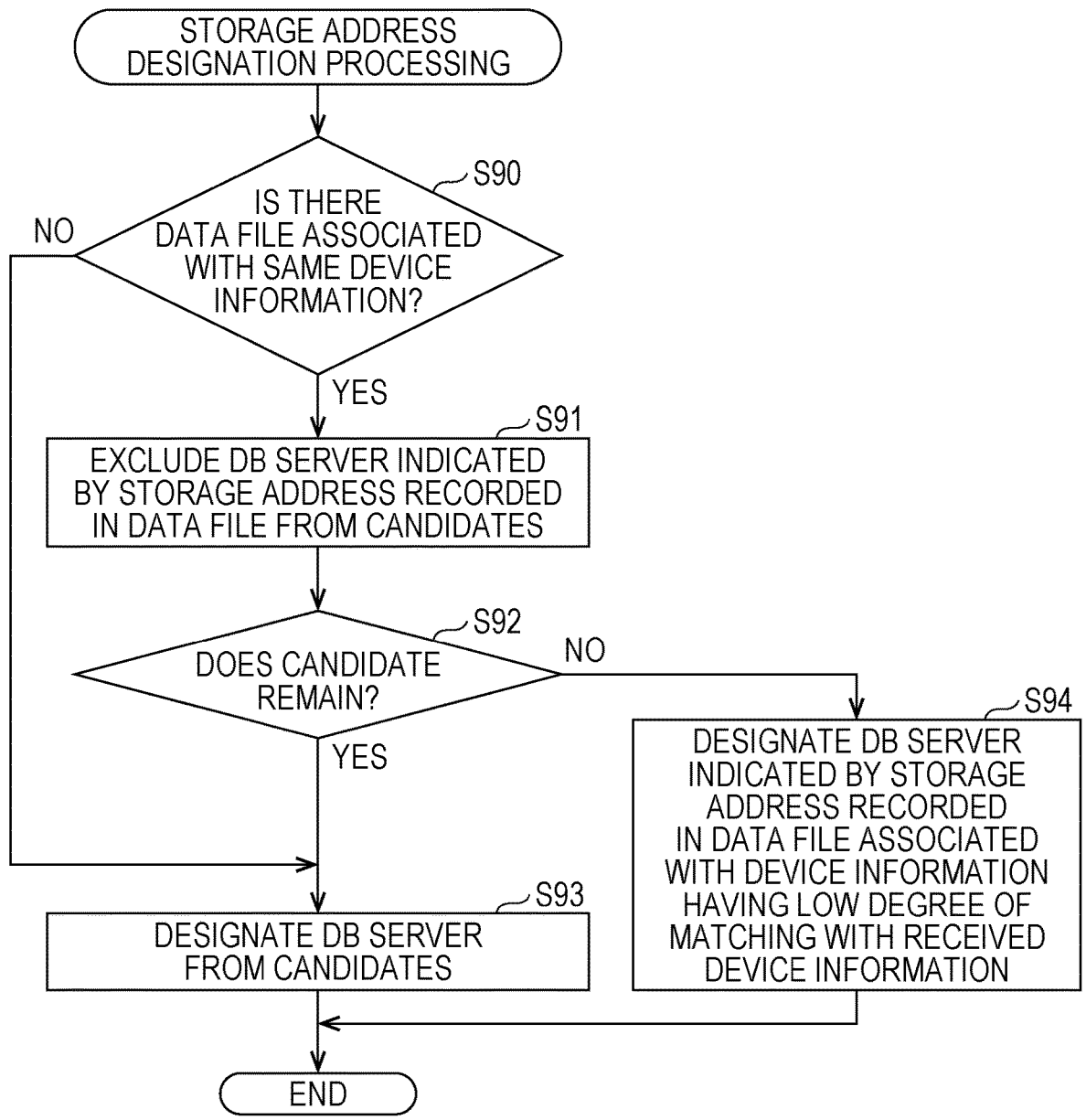
FIG. 14 is a flowchart illustrating an example of storage address designation processing.

The storage address designation processing in step S76 will be described with reference to FIG. 14. The CPU 41 executes the second information processing program 47 in the terminal device 30 to execute the storage address designation processing illustrated in FIG. 14.

In step S90, the second management unit 38 refers to the data file (see FIG. 7) created in the past, and determines whether or not there is a data file associated with the same device information as the device information related to the biological information acquisition device 10 with which the connection via wireless communication is currently established. In a case where an affirmative determination is made in step S90 (that is, in a case where there is a data file associated with the same device information as the device information related to the biological information acquisition device 10 with which the connection is currently established), the process proceeds to step S91.

In step S91, the second management unit 38 excludes the DB server 8 indicated by the storage address recorded in the data file associated with the same device information as the device information related to the biological information acquisition device 10 with which the connection is currently established, from the candidates (see FIG. 11) of the DB server 8. In step S92, the second management unit 38 determines whether or not candidates for the DB server 8 remain.

In a case where a negative determination is made in step S90 (that is, in a case where there is no data file associated with the same device information as the device information related to the biological information acquisition device 10 with which the connection is currently established), and in a case where an affirmative determination is made in step S92 (that is, in a case where the candidates for the DB server 8 remain), the process proceeds to step S93. In step S93, the second management unit 38 designates the DB server 8 from the remaining candidates, and ends the storage address designation processing.

On the other hand, in a case where a negative determination is made in step S92 (that is, in a case where the candidates for the DB server 8 do not remain), the process proceeds to step S94. In step S94, the second management unit 38 designates the DB server 8 indicated by the storage address recorded in the data file associated with the device information having a low degree of matching with the received device information (that is, the device information related to the biological information acquisition device 10 with which the connection is currently established), and ends the storage address designation processing.

As described above, the terminal device 30 according to the second exemplary embodiment refers to the storage address recorded in the data file created in the past, and designates the storage address such that the biological information is distributed and stored in the plurality of DB servers 8. That is, in a case where there are the plurality of DB servers 8 that can be accessed by the terminal device 30, it is possible to store the biological information in a distributed manner, and thus, it is possible to further improve the confidentiality.

Note that, in the second exemplary embodiment, a mode has been described in which the terminal device 30 records the storage address in the data file after the connection with the biological information acquisition device 10 is released, but the order of these processes may be switched. That is, the terminal device 30 may record the storage address in the data file while establishing the connection with the biological information acquisition device 10, and may release the connection with the biological information acquisition device 10 after the recording.

Furthermore, in the second exemplary embodiment, a mode has been described in which the biological information acquisition device 10 stores the biological information in the DB server 8 while establishing the connection with the terminal device 30, and releases the connection with the terminal device 30 after the storage, but the order of these processes may be switched. That is, after receiving the storage address from the terminal device 30, the biological information acquisition device 10 may release the connection with the terminal device 30, and then store the biological information in the DB server 8 indicated by the storage address.

As described in the first and second exemplary embodiments, the storage address may be shared between the biological information acquisition device 10 and the terminal device 30, and may be set by either the biological information acquisition device 10 or the terminal device 30. That is, the biological information acquisition device 10 of the present disclosure includes at least a first processor, and the first processor establishes a connection via wireless communication with the terminal device 30 owned by the user, acquires biological information of the user, stores the biological information in the external DB server 8, shares a storage address indicating a storage destination of the biological information in the DB server 8 with the terminal device 30 via wireless communication, and releases the connection with the terminal device 30 via wireless communication after sharing the storage address with the terminal device 30. The order of these processes may be appropriately switched.

Furthermore, in each of the exemplary embodiments, for example, the following various processors can be used as a hardware structure of processing units performing various processes, such as the acquisition unit 12, the first guide unit 14, the first communication unit 16, and the first management unit 18, as well as the second guide unit 34, the second communication unit 36, and the second management unit 38. As described above, in addition to the CPU which is a general-purpose processor executing software (programs) to function as various processing units, the various processors include a programmable logic device (PLD) which is a processor capable of changing a circuit configuration after manufacture such as a field-programmable gate array (FPGA), a dedicated electric circuit which is a processor having a circuit configuration exclusively designed to execute specific processing such as an application-specific integrated circuit (ASIC), and the like.

One processing unit may be configured by one of these various processors, or may be configured by a combination of two or more processors of the same type or different types (for example, a combination of a plurality of the FPGAs or a combination of the CPU and the FPGA). Furthermore, the plurality of processing units may be configured by one processor.

As an example in which the plurality of processing units are configured by one processor, first, as represented by a computer such as a client and a server, there is a mode in which one processor is configured by a combination of one or more CPUs and software and this processor functions as the plurality of processing units. Second, as represented by a system-on-chip (SoC) or the like, there is a mode in which a processor is used that realizes the functions of the entire system including a plurality of processing units with one integrated circuit (IC) chip. As described above, the various processing units are configured using one or more of the various processors as a hardware structure.

Moreover, more specifically, an electric circuit (circuitry) in which circuit elements such as semiconductor elements are combined can be used as the hardware structure of the various processors.

Furthermore, in each of the exemplary embodiments, an aspect has been described in which the first information processing program 27 is stored (installed) in the storage unit 22 in advance, but the present disclosure is not limited thereto. The first information processing program 27 may be provided in a mode of being recorded on a recording medium such as a compact disc read-only memory (CD-ROM), a digital versatile disc read-only memory (DVD-ROM), or a universal serial bus (USB) memory. Furthermore, the first information processing program 27 may be downloaded from an external device through a network. Moreover, the technique of the present disclosure extends to a storage medium that stores the information processing program in a non-transitory manner, in addition to the information processing program.

Similarly, in each of the exemplary embodiments, an aspect has been described in which the second information processing program 47 is stored (installed) in the storage unit 42 in advance, but the present disclosure is not limited thereto. The second information processing program 47 may be provided in a mode of being recorded on a recording medium such as a CD-ROM, a DVD-ROM, or a USB memory. Furthermore, the second information processing program 47 may be downloaded from an external device through a network. Moreover, the technique of the present disclosure extends to a storage medium that stores the information processing program in a non-transitory manner, in addition to the information processing program.

In the technique of the present disclosure, the above-described exemplary embodiments may be appropriately combined. The above-described contents and illustrated contents are detailed descriptions for parts according to the embodiment of the technique of the present disclosure and are merely one example of the technique of the present disclosure. For example, the description related to the configuration, the function, the action, and the effect is a description related to an example of a configuration, a function, an action, and an effect of a portion according to the technique of the present disclosure. Accordingly, it goes without saying that unnecessary portions may be deleted, new elements may be added, or replacements may be made with respect to the contents and the illustrated contents described above without departing from the scope of the technique of the present disclosure.

The disclosure of Japanese patent application No. 2021-030782 filed on Feb. 26, 2021 is incorporated herein by reference in its entirety. All documents, patent applications, and technical standards described in this specification are herein incorporated by reference to the same extent as if each individual publication, patent application, or technical standard was specifically and individually indicated to be incorporated by reference.

What is claimed is:

1. A biological information acquisition device comprising: at least a first processor, wherein the first processor is configured to:
   establish a connection with a terminal device owned by a user via wireless communication;
   acquire biological information of the user;
   store the biological information in a database server that is external;
   share a storage address indicating a storage destination of the biological information in the database server with the terminal device via the wireless communication; and
   release the connection with the terminal device via the wireless communication after sharing the storage address with the terminal device.

2. The biological information acquisition device according to claim 1, wherein the first processor is configured to delete a connection history with the terminal device after sharing the storage address with the terminal device.

3. The biological information acquisition device according to claim 1, wherein the first processor is configured to:
   receive designation of the storage address from the terminal device before storing the biological information in the database server; and
   store the biological information in the database server in accordance with the storage address designated by the terminal device.

4. The biological information acquisition device according to claim 1, wherein the first processor is configured to:
encrypt the biological information via a predetermined method; and
store the encrypted biological information in the database server.

5. The biological information acquisition device according to claim 4, wherein the first processor is configured to:
receive a public key from the terminal device; and
store the biological information encrypted using the public key in the database server.

6. The biological information acquisition device according to claim 1, wherein the first processor is configured to establish the connection with the terminal device via the wireless communication in a case where the connection with the terminal device via the wireless communication is permitted.

7. The biological information acquisition device according to claim 1, wherein the first processor is configured to establish the connection with the terminal device via the wireless communication in a case where the terminal device is within a communicable range of the wireless communication.

8. The biological information acquisition device according to claim 1, wherein the first processor is configured to establish the connection with the terminal device via the wireless communication in a case where the connection with the terminal device via the wireless communication is permitted in advance and the terminal device is within a communicable range of the wireless communication.

9. The biological information acquisition device according to claim 8, wherein:
in the terminal device, the biological information acquisition device of a connection permission target via the wireless communication is set in advance according to at least one of identification information of the biological information acquisition device, a type of the biological information acquired by the biological information acquisition device, or an installation location of the biological information acquisition device, and
the first processor is configured to establish the connection with the terminal device via the wireless communication in a case where the biological information acquisition device is included in the connection permission target set in advance in the terminal device and the terminal device is within the communicable range of the wireless communication.

10. The biological information acquisition device according to claim 1, wherein the biological information acquisition device is available for use by an unspecified number of users.

11. The biological information acquisition device according to claim 1, wherein the biological information indicates at least one of a body temperature, a heartbeat, an electrocardiogram, a myoelectricity, a blood pressure, a weight, a body fat percentage, a muscle mass, a bone density, a blood glucose level, a urine sugar, a urine protein, or urine occult blood.

12. The biological information acquisition device according to claim 1, wherein the wireless communication is a communication method using at least one of Bluetooth, a BLE beacon, or an RFID.

13. A biological information acquisition system comprising:
the biological information acquisition device according to claim 1; and
the terminal device including a second processor.

14. The biological information acquisition system according to claim 13, wherein the second processor is configured to create a data file in which the storage address shared with the biological information acquisition device and information regarding the biological information acquisition device are recorded in association with each other.

15. The biological information acquisition system according to claim 14, wherein the second processor is configured to:
create, in a case where the connection with the biological information acquisition device via the wireless communication is established, the data file related to the biological information acquisition device; and
prohibit creation of a data file related to another biological information acquisition device before the storage address shared with the biological information acquisition device is recorded in the data file.

16. The biological information acquisition system according to claim 14, wherein:
the second processor is configured to refer to the storage address recorded in the data file created in the past and designates the storage address such that the biological information is distributed and stored in a plurality of the database servers, and
the first processor is configured to store the biological information in the database servers in accordance with the storage address designated by the second processor.

17. The biological information acquisition system according to claim 16, wherein:
the storage address shared with the biological information acquisition device and information indicating at least one of identification information of the biological information acquisition device, a type of the biological information acquired by the biological information acquisition device, or an installation location of the biological information acquisition device are recorded in association with each other in the data file, and
the second processor is configured to refer to the data file created in the past and designates the storage address such that a database server different from the database servers indicated by the storage address associated with the same information as the information regarding the biological information acquisition device with which a connection via the wireless communication is currently established is set as a storage destination of the biological information.

18. The biological information acquisition system according to claim 13, wherein, the second processor is configured to prohibit in a case where the connection with the biological information acquisition device via the wireless communication is established, a connection with another biological information acquisition device via the wireless communication before the connection with the biological information acquisition device via the wireless communication is released.

19. A biological information acquisition method in which a computer executes processing of:
establishing a connection with a terminal device owned by a user via wireless communication;
acquiring biological information of the user;
storing the biological information in a database server that is external;
sharing a storage address indicating a storage destination of the biological information in the database server with the terminal device via the wireless communication; and releasing the connection with the terminal device via the wireless communication after sharing the storage address with the terminal device.

20. A non-transitory computer-readable storage medium storing a biological information acquisition program for causing a computer to execute processing of:
- establishing a connection with a terminal device owned by a user via wireless communication;
- acquiring biological information of the user;
- storing the biological information in a database server that is external;
- sharing a storage address indicating a storage destination of the biological information in the database server with the terminal device via the wireless communication; and
- releasing the connection with the terminal device via the wireless communication after sharing the storage address with the terminal device.

* * * * *